March 21, 1950 G. L. HALLER 2,501,048
ANNOUNCING SYSTEM
Filed Oct. 11, 1946
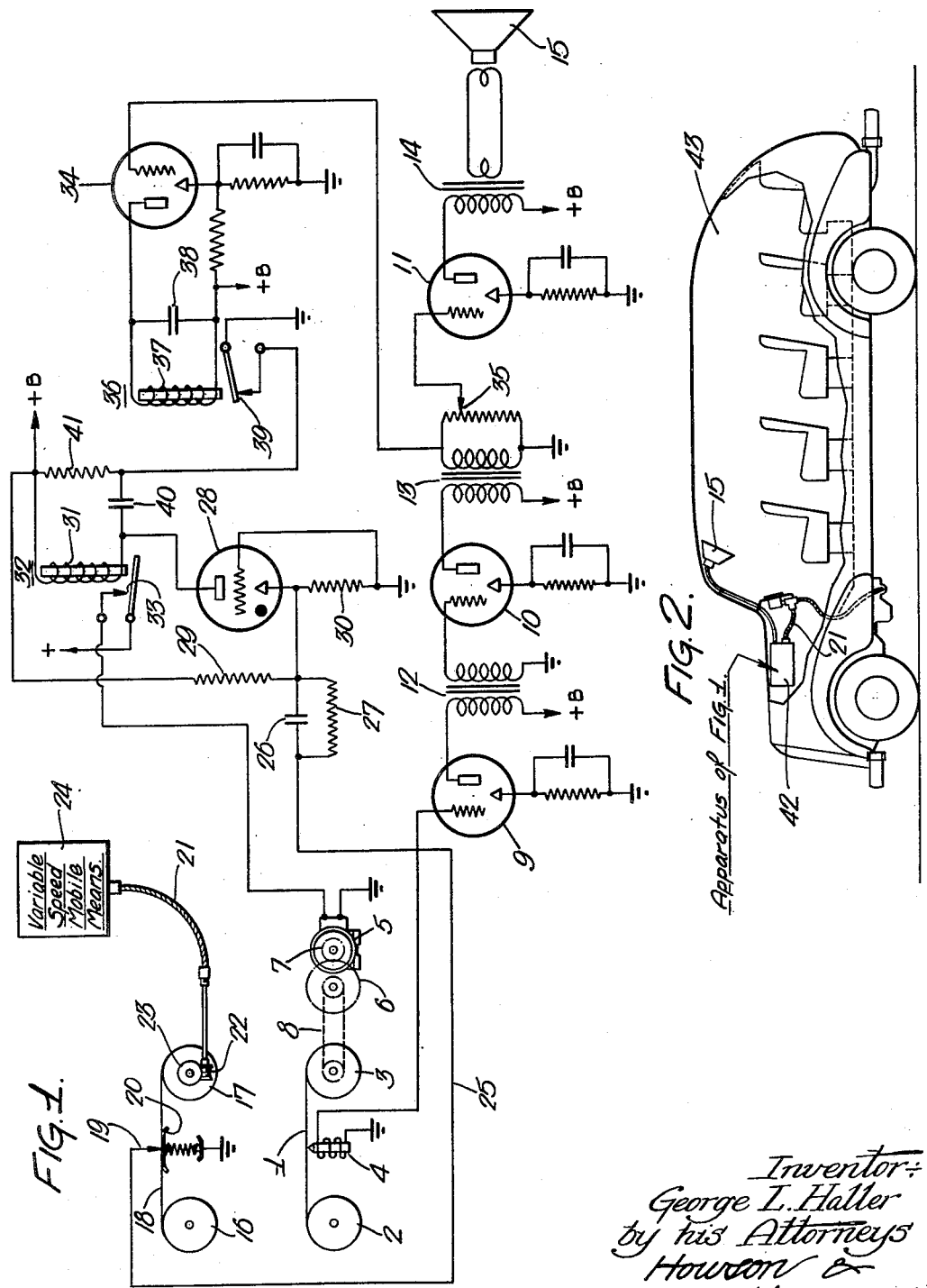
Inventor:
George L. Haller
by his Attorneys
Howson &
Howson Patented Mar. 21, 1950

2,501,048

UNITED STATES PATENT OFFICE 2,501,048

ANNOUNCING SYSTEM

George L. Haller, State College, Pa., assignor to Haller, Raymond and Brown, Inc., State College, Pa., a corporation of Pennsylvania Application October 11, 1946, Serial No. 702,645

4 Claims. (Cl. 177—311)

This invention relates to announcing systems, and more particularly to systems which are adapted to reproduce pre-recorded announcements.

The principal object of the invention is to provide a system wherein successive recorded announcements are reproduced in synchronism or correlation with the travel of a variable speed mobile means.

A more specific object of the invention is to provide a system of this character which is adapted to be used in conjunction with a vehicle or mobile craft so as to reproduce the successive recorded announcements in synchronism or correlation with distance traveled by the vehicle. When thus applied, the invention may be used for various purposes some of which will be mentioned later.

An important feature of the system is the synchronizing arrangement by which the reproduction of the recorded announcements is synchronized or correlated with preselected distances traveled by the vehicle or other mobile means.

Another feature of the system is the ability to use interchangeable cartridges of pre-recorded announcements for different purposes.

A further feature of the system is the employment of a key or code selector to synchronize the announcements with the travel of the vehicle or mobile means.

Still another feature of the system is the ability to change or select the code of the synchronizer to match different announcement cartridges.

Other objects and features of the invention will be apparent from the following detailed description.

In the accompanying drawing:

Fig. 1 is a diagrammatic illustration of a preferred embodiment of the system; and Fig. 2 is a general illustration of a vehicle equipped with the system of Fig. 1.

Referring to Fig. 1, the pre-recorded announcements are preferably magnetically recorded on a magnetic wire or tape 1 which may move from spool 2 to spool 3 past the magnetic pickup 4. The spool 3 is driven by a motor 5 through gears 6 and 7 and a belt drive 8. The pickup 4 translates the successive recorded announcements into audio frequency signals which are supplied to a conventional multi-stage audio amplifier comprising tubes 9, 10 and 11, coupling transformers 12 and 13, and output transformer 14. The audio frequency signals are translated into sound by one or more conventional loud speakers as represented at 15.

In accordance with the present invention, the operation of motor 5 is controlled by the mechanisms now to be described. A pair of spools 16 and 17 serve to move a non-conductive perforated tape 18 between a pair of switch contacts 19 and 20. Spool 17 is driven by a flexible shaft 21 through a worm 22 and worm wheel 23. The flexible shaft 21 is driven by a variable speed mobile means represented generally by the rectangle 24. Such means may be a wheel of a vehicle or some other moving element thereon, such as an element of the vehicle speedometer. Thus, the tape 18 is driven at a rate or speed which is synchronized or correlated with the speed of the mobile means 24. In the case of a vehicle, the tape 18 is driven according to the speed of the vehicle. Contact 20 is grounded, while contact 19 is connected via conductor 25 to one side of a capacitor 26 which is shunted by a discharging resistor 27. The opposite side of capacitor 26 is connected to the cathode of a thyratron 28, and is also connected through resistor 29 to a source of direct current B-supply. The cathode of thyratron 28 is connected to the ungrounded end of resistor 30, while the control grid of thyratron 28 is connected to the grounded end of said resistor. The anode of the thyratron 28 is connected to the B-supply through the winding 31 of a relay 32 whose normally-open contacts 33 are included in an energizing circuit for the motor 5. Any suitable voltage source, such as a battery, may be connected to the conductor marked + so as to energize the motor when contacts 33 are closed.

By the arrangement thus far described, the motor 5 is energized, through the operation of the thyratron 28, upon closure of the contacts 19 and 20. The thyratron maintains the energization of motor 5, regardless of whether contacts 19 and 20 remain closed, until the anode potential of the thyratron is reduced. The thyratron is rendered non-conductive and the motor 5 is deenergized, at the end of the recorded announcement, by the mechanism now to be described.

A relay tube 34, which is normally biased to cut-off, has its grid connected to the ungrounded end of the volume control potentiometer 35, so that a portion of the signal voltage is applied to the grid of tube 34. The tube 34 controls a speech relay 36 whose winding 37 is connected in the anode circuit of the tube. A capacitor 38 is shunted across the relay winding 37 to provide a time delay circuit which prevents the relay 36 from dropping out during momentary pauses in the speech or during portions of the announcement when the voice energy is low. It will be understood that the capacitance of capacitor 38 should be chosen to give the desired time constant. The normally-closed contacts 39 of relay 36 are connected respectively to ground and to the junction point of a capacitor 40 and its discharging resistor 41, the latter elements being connected across the relay winding 31 as shown. The relay 36 serves to render the thyratron 28 non-conductive at the end of each recorded announcement, as described hereinafter.

Considering the operation of the system as a whole, normally the contacts 19 and 20 are separated by the insulating tape 18, and relays 32 and 36 are both deenergized. Capacitor 26 is discharged and capacitor 40 is charged. Current flows through resistor 30 from the B-supply by way of resistor 29, and the voltage drop across resistor 30 biases the grid of the thyratron 28 sufficiently negative, with respect to the cathode, to prevent conduction of the thyratron. When one of the perforations in tape 18 reaches the contacts 19 and 20, the contacts are permitted to close, thereby connecting the left-hand side of capacitor 26 to ground. Consequently, capacitor 26 commences to charge and the charging current flowing through resistor 29 causes a greater voltage drop thereacross, and the positive potential on the cathode of the thyratron 28 is lowered, causing the thyratron to conduct. Relay 32 is thus energized, closing the energizing circuit for motor 5. The thyratron remains conductive until its plate or anode potential is reduced, because once it is started it can only be stopped by reduction of its anode potential. The energization of motor 5 causes the record element 1 to move past pickup 4, and the reproduction of a recorded announcement commences. The signal voltage applied to relay tube 34 causes energization of relay 36, thus opening the relay contacts 39 and causing capacitor 40 to discharge.

At the end of the record announcement, the cessation of the signal causes deenergization of relay 36 with consequent closing of its contacts 39. The closure of these contacts connects the junction point of capacitor 40 and resistor 41 to ground. Consequently, capacitor 40 commences to charge, and the charging current causes sufficient drop in the potential on the anode of thyratron 28 to render the thyratron non-conductive. This causes deenergization of relay 32 and consequent deenergization of motor 5.

Thus, it will be seen that motor 5 is started by the closure of contacts 19 and 20 and is stopped at the end of the recorded announcement by the deenergization of the speech relay 36. The above-described operating cycle is repeated for each of the successive announcements recorded on element 1. The time of commencement of each announcement is controlled by tape 18 through contacts 19 and 20 according to the speed of the mobile means 24. It is important to note that the control of the motor 5 by means of the thyratron 28, the voice relay 36 and the capacitors 26 and 40 not only assures continuance of an announcement until it is finished regardless of whether contacts 19 and 20 remain closed, but also prevents succeeding announcements from being given in the event that the mobile means 24 happens to be stopped with the contacts 19 and 20 closed. This is due to the fact that the starting of the thyratron depends on the charging of capacitor 26, and once the capacitor has been charged by one closure of contacts 19 and 20, it cannot discharge until the contacts open.

An important feature of the system is the ability to change the tape or code selector and the record element. This merely involves changing the spools which carry these elements. Thus, it is possible to change the announcements at will, and it is also possible to change the times at which the announcements are given.

As previously indicated, a particular application of the system is its utilization in conjunction with a vehicle such as shown in Fig. 2. In that figure, the apparatus of Fig. 1 is represented generally by the rectangle 42, being carried by the vehicle 43. The flexible cable 21 is shown as being driven from the speedometer drive of the vehicle. The loud speaker 15 is mounted in a suitable location on the vehicle.

When the system is thus utilized, the successive recorded announcements are reproduced at preselected points of travel of the vehicle, depending on the code selector tape 18. Thus the tape 18 may be of such character as to cause reproduction of the recorded announcements in conjunction with objects along the path of travel of the vehicle. For example, the system could be used on a sight-seeing vehicle, as shown in Fig. 2, to describe objects of interest along the path of travel.

There are many other uses to which the system may be applied. It may be used on private automobiles, in which case cartridges of pre-recorded announcements and corresponding code selectors may be made available to tourists for use over certain routes of travel, the announcements dealing with things or conditions along such routes. The cartridges could be made available as an advertising service by a company or groups of companies.

The system may also be used on transportation vehicles to announce stations or streets.

In the system illustrated, the reproduction of the recorded announcements is controlled by the coding device which is driven by the variable speed means or vehicle, and which controls the closure of contacts 19 and 20. However, the system could be controlled in other ways. For example, the contacts 19 and 20 could be contacts of a relay which could be controlled remotely to cause reproduction of the announcements at certain points in the path of a moving vehicle. Thus in the case of a railway vehicle, the relay could be operated by induction or by radio control at various points along the track. In the case of an airplane, the relay could be operated by means of a radio beacon.

While directed particularly to use with a vehicle, in its broader aspect, the invention contemplates the use of the system in conjunction with any mobile means wherever it may be desired to reproduce successive recorded announcements in synchronization or correlation with the travel of such means. For example, the system might be employed in conjunction with an automatic still-picture projector to give a narration with each picture. In such case, the reproduction of the successive recorded announcements could be controlled by a moving element on the projector.

While the invention has been described with reference to a specific embodiment, it is not limited thereto but contemplates such other embodi-

I claim:

1. In a system of the class described, mobile means, a sound record containing a plurality of sequential recorded announcements, means including an electric motor for driving said record, means for translating the recorded announcements into audio frequency signals and thence into sounds, means for controlling the operation of said motor, means operable by said mobile means to initiate operation of said motor, through the medium of said controlling means, at preselected points of travel of said mobile means, thereby to initiate reproduction of each announcement at one of said points, and means controlled by cessation of said signals to terminate the operation of said motor at the end of each announcement independently of said initiating means.

2. In a system of the class described, mobile means, a sound record containing a plurality of sequential recorded announcements, means including an electric motor for driving said record, means for translating the recorded announcements into audio frequency signals and thence into sounds, means including a thyratron for controlling the operation of said motor, means operable by said mobile means to initiate operation of said thyratron and thus initiate operation of said motor at preselected points of travel of said mobile means, thereby to initiate reproduction of each announcement at one of said points, and means controlled by cessation of said signals to terminate the operation of said thyratron and thus terminate operation of said motor at the end of each announcement independently of said initiating means.

3. In a system of the class described, mobile means, a sound record containing a plurality of sequential recorded announcements, means including an electric motor for driving said record, means for translating the recorded announcements into audio frequency signals and thence into sounds, means for controlling the operation of said motor, means operable by said mobile means to initiate operation of said motor, through the medium of said controlling means, at preselected points of travel of said mobile means, thereby to initiate reproduction of each announcement at one of said points, and means operable upon cessation of said signals at the end of each announcement to terminate the operation of said motor independently of said initiating means.

4. In a system of the class described, mobile means, a sound record containing a plurality of sequential recorded announcements, means including an electric motor for driving said record, means for translating the recorded announcements into audio frequency signals and thence into sounds, means including a thyratron for controlling the operation of said motor, means operable by said mobile means to initiate operation of said thyratron and thus initiate operation of said motor at preselected points of travel of said mobile means, thereby to initiate reproduction of each announcement at one of said points, and means operable upon cessation of said signals at the end of each announcement to terminate the operation of said thyratron and thus terminate operation of said motor independently of said initiating means.

GEORGE L. HALLER.

REFERENCES CITED

The following references are of record in the file of this patent:

UNITED STATES PATENTS

| Number | Name | Date |
| --- | --- | --- |
| 1,417,983 | Freeble | May 30, 1922 |
| 2,070,900 | Harris | Feb. 16, 1937 |
| 2,130,290 | Polta et al. | Sept. 13, 1938 |
| 2,206,998 | Beizer | July 9, 1940 |
| 2,288,683 | Clancy | July 7, 1942 |
| 2,362,918 | Miller | Nov. 14, 1944 |